United States Patent

Scheerer

[15] 3,691,759

[45] Sept. 19, 1972

[54] AUTOMATIC CONTROL SYSTEM FOR A TURBOJET ENGINE EMPLOYED IN A STATIONARY ENVIRONMENT

[72] Inventor: Arthur M. Scheerer, Wayne, N.J.
[73] Assignee: Curtiss-Wright Corporation
[22] Filed: Jan. 14, 1971
[21] Appl. No.: 106,496

[52] U.S. Cl. ..............60/39.09, 60/39.14, 60/39.28
[51] Int. Cl. ..........F02g 3/00, F02c 7/26, F02c 9/04
[58] Field of Search..............60/39.09, 39.14, 39.28

[56] References Cited

UNITED STATES PATENTS

| | | | |
|---|---|---|---|
| 3,135,088 | 6/1964 | Holmes | 60/39.14 |
| 2,888,801 | 6/1959 | Dotson | 60/39.14 |
| 2,938,338 | 5/1960 | Creswick | 60/39.14 |
| 2,763,985 | 9/1956 | Speer | 60/93.7 |
| 3,310,937 | 3/1967 | Smith | 174/15 |
| 2,962,597 | 11/1960 | Evans | 290/2 |
| 3,038,306 | 6/1962 | Loft | 60/39.14 |
| 3,220,192 | 11/1965 | Sheppard | 60/97 |
| 2,949,011 | 8/1960 | Bancroft | 60/39.9 |
| 2,874,541 | 2/1959 | Oberlin | 60/39.28 |
| 2,847,824 | 8/1958 | Best | 60/39.14 |

Primary Examiner—Laurence M. Goodridge
Assistant Examiner—Ronald B. Cox
Attorney—Arthur L. Frederick and Victor D. Behn

[57] ABSTRACT

A control system for a turbojet engine which provides a single on-off switch to initiate start-up and shutdown phases of operation of the engine. The control system has a plurality of sensing elements and time delay electrical switches and valves interconnected to automatically control operation of auxiliary components of the engine, such as pumps, motors and fans, and the engine in proper sequence as well as monitor their operations during start-up, sustained and shutdown phases of operation of the engine. The system also has various failsafe circuits which include sensing elements which are set or adjusted to automatically effect shutdown of the engine upon malfunction during any of the phases of operation of the engine.

6 Claims, 3 Drawing Figures

AUTOMATIC CONTROL SYSTEM FOR A TURBOJET ENGINE EMPLOYED IN A STATIONARY ENVIRONMENT

DISCLOSURE OF INVENTION

This invention relates to control systems for turbine engines and, more particularly, to control systems for turbojet engines employed industrially as distinguished from use as a vehicle or aircraft propulsion means.

BACKGROUND OF THE INVENTION

In the application of turbojet engines for industrial uses, such as a power source for driving electrical generators, compressors and pumps, it is desirable to provide a control means capable of automatically regulating the operation of the turbojet engine through start-up, sustained and shutdown phases of operation. It is also desirable to provide an unattended control system for a turbojet engine which monitors engine operation and automatically effects shutdown of the engine upon a malfunction. This failsafe monitoring feature protects the engine against damage resulting from such malfunctions as overspeed, excess temperature, low oil pressure, excessive vibration and the like. Since a turbojet engine and auxiliary components present a rather complex, sophisticated assembly and highly skilled operators are not economically available to oversee proper operation of such a turbojet engine assembly, a control system having a single on-off switch and which is self-monitoring, is essential for an industrial installation of a turbojet engine.

Accordingly, it is the primary object of this invention to provide a control system for turbojet engines employed in stationary industrial applications of such engines, which system automatically controls the operation of the engine through start-up, sustained and shutdown phases following the actuation of a single control means.

It is another object of the present invention to provide a control system for turbojet engines employed in stationary industrial installations which includes means for automatically effecting shutdown of the engine in the event of a defect or malfunction of the engine.

A further object of this invention is the provision of a control system for stationary application of turbojet engines, which system is capable of controlling the operation of the engine from a point remote from the engine location.

SUMMARY OF THE INVENTION

The invention therefore contemplates for a stationary application of a turbojet engine of the type exemplified in the U.S. Pat. No. 3,267,676 and No. 3,433,015, a control system comprising a plurality of electrical and/or electronic components interconnected in a circuit to control and monitor various auxiliary systems and components of the engine as well as the engine function. The circuit includes a single on-off switch which initiates start-up operation of the engine and shutdown operation. In the "on" position of the on-off switch a source of electrical power is connected to various auxiliary components, such as fuel pumps, hydraulic pumps, cooling fans, and lubricating pumps. The operation of these auxiliary components along with cranking of the engine through a self-starter motor, fuel priming ignition, and acceleration of the engine to idle speed is achieved in proper sequence by multi-switch means responsive to engine speed and coacting with and controlling the actuation of electro mechanical relays and/or solid-state gates which, in turn, control the operation of the aforementioned auxiliary components. After a suitable dwell period, electrical power is applied to the motorized control device of the fuel control circuit and, through regulation of fuel flow, the engine is accelerated to full speed. After full speed is attained, electrical current to the motor of the fuel controller is stopped and fuel is set to maintain full engine speed. When shutdown of the engine is desired, the on-off switch is turned to the "off" position which energizes the motor of the fuel controller to cause a reduction in the amount of fuel delivered to the engine, and, hence, a gradual reduction in RPM of the engine until idle speed is reached. Following a cooling dwell period, as determined by a time-delay relay, the main fuel valve is energized and moved to a closed position to thereby stop the engine. Following stoppage of the engine, the auxiliary components are shutdown.

The proper sequential, automatic operation is achieved through the cooperative relationship of multi-switch, speed switch means, hereinafter referred to as a "sequence," which functions on a basis of switching logic performed by electromechanical relays or solid state gates after start-up is initiated by the single on-off switch which is in the "start" or "on" position initiates the function of a motorized timer means and relays. In the "off" position the single on-off switch initiates shutdown by causing the fuel controller motor means to operate to close the main fuel valve so that the timer means can control engine functions in a reverse sequence of operation.

The control system also includes several failsafe means which function to shutdown the engine during the start-up and sustained phases of operation when a malfunction occurs. More specifically, temperature responsive switch means is provided to sense primer fuel ignition or "lightoff" and main fuel ignition or "lightoff" and if a predetermined temperature is not reached within a selected time period, such as 8 seconds, solenoid actuated fuel control valves are closed to cut off priming fuel flow in the one case and main fuel flow where main fuel ignition is not successful. In addition, means is provided to effect shutdown of the engine upon engine RPM in excess of a predetermined amount. Also, the control system includes a means for effecting shutdown of the engine if during starting operation a predetermined engine RPM (such as 3,000 RPM) is not reached within a present time interval. Other safety features include means for effecting shutdown of the engine in the event oil pressure falls below a desired minimum value or upon excessive vibration of the engine. A still further safety feature is the means for providing alternating current power during temporary loss of primary input AC power not exceeding a predetermined period, such as 2 seconds, and shutdown of the engine if AC input power is not restored within the predetermined time period.

BRIEF DESCRIPTION OF THE DRAWINGS

The invention will be more fully understood from the following description when considered in connection with the accompanying drawings in which.

DESCRIPTION OF THE PREFERRED EMBODIMENT

Figure 1:
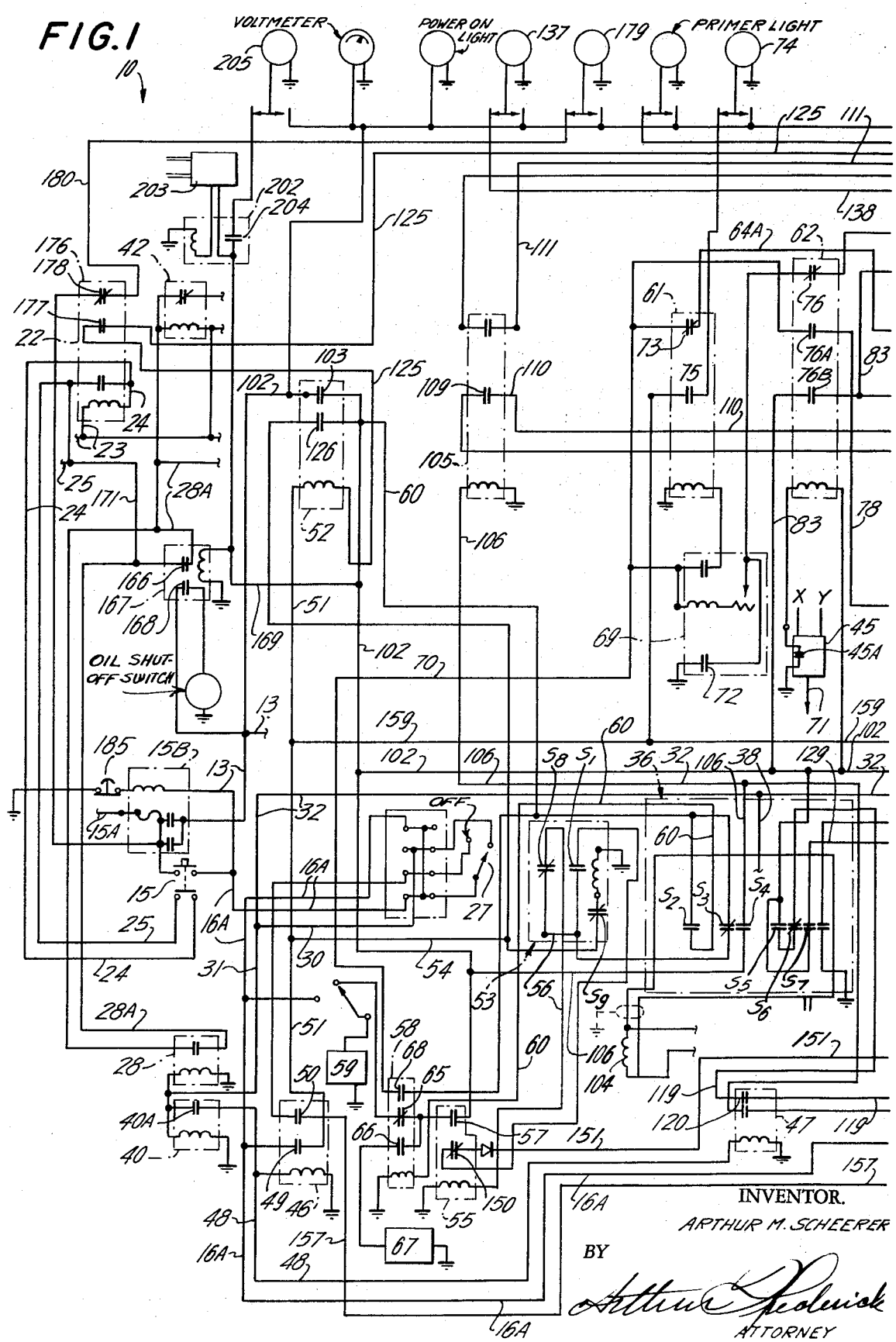
FIGS. 1, 2 and 3 each show a portion of the turbojet engine control system according to this invention.

Now referring to the drawings in which the turbojet engine control system according to this invention is shown, the reference number 10 generally designates the control system. While the control system 10 is, in general, directed to the control of the operation of a turbojet engine employed in a stationary industrial assembly, it will be described, for illustrative purposes, for controlling a turbojet engine modified to deliver compressed air as disclosed in co-pending U.S. patent application Ser. No. 41,509, filed May 28, 1970, and assigned to the same assignee. In such a turbojet engine serving to supply compressed air, a portion of the compressed air from the compressor section of the engine is diverted or bypassed, through a valve controlled outlet pipe, from the main stream of compressed air before its entry into the combustion section of the engine. Also, for purposes of illustration and without departure from the scope and spirit of the invention the control system 10 will also be described as controlling a turbojet engine of the type, such as shown in U.S. Pat. No. 3,267,767, having a vaporizing combustor in which ignition of a primer or pilot fuel flow must be achieved before initiating the main fuel flow and combustion thereof. The fuel is supplied from a tank reservoir (not shown) to the engine combustor by a positive displacement pump (not shown) driven by the engine accessory gear box (not shown).

Figure 3:
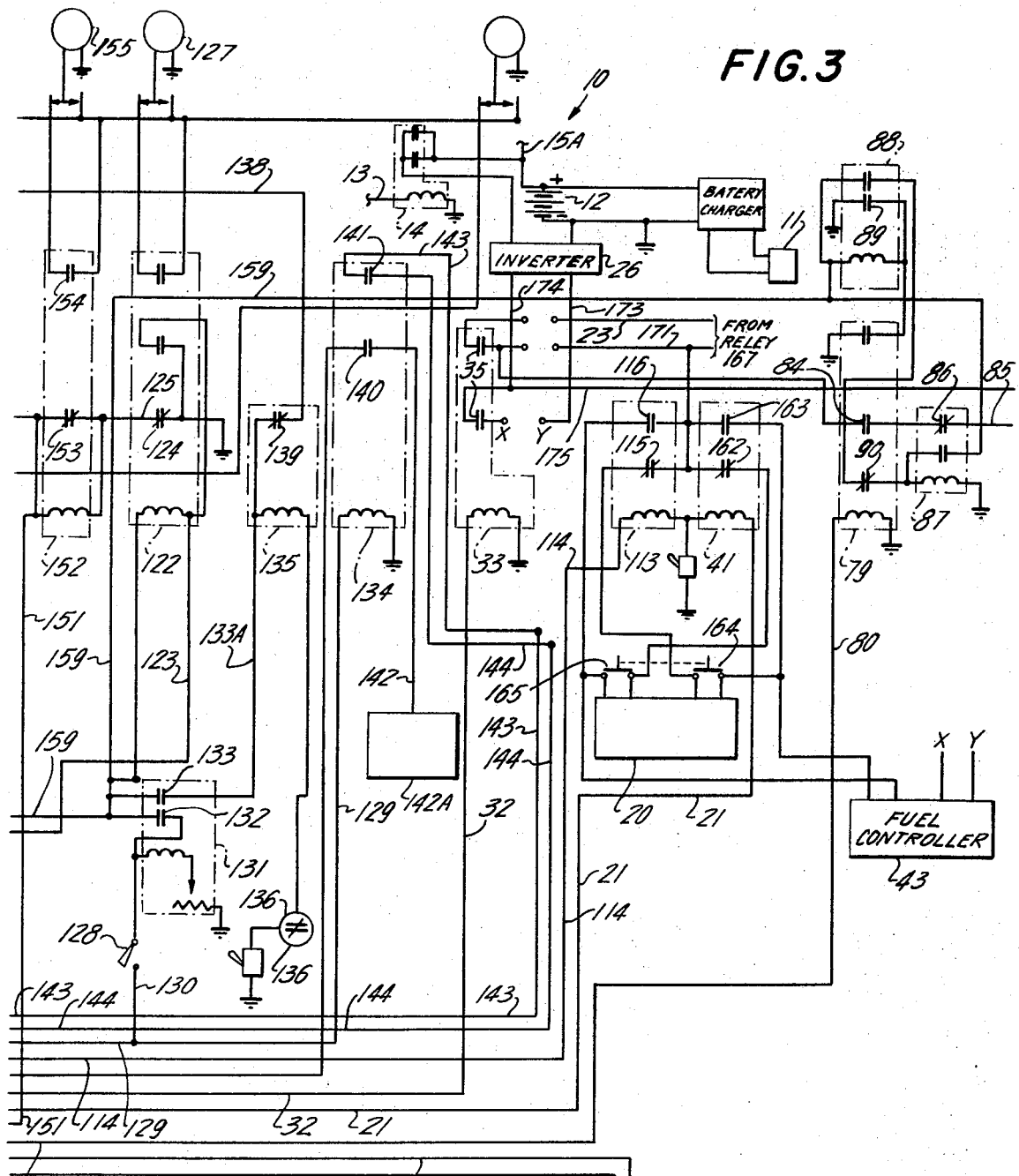

As shown in the drawings, the control system comprises a suitable source of 110 volt alternating current (AC) 11 and a source of direct current (DC) which may be a 24 volt battery 12 (see FIG. 3). The battery 12 is connected through a line 15A (FIG. 3) and a relay 15B, to a reset, button type, switch 15 (FIG. 1).

Figure 2:
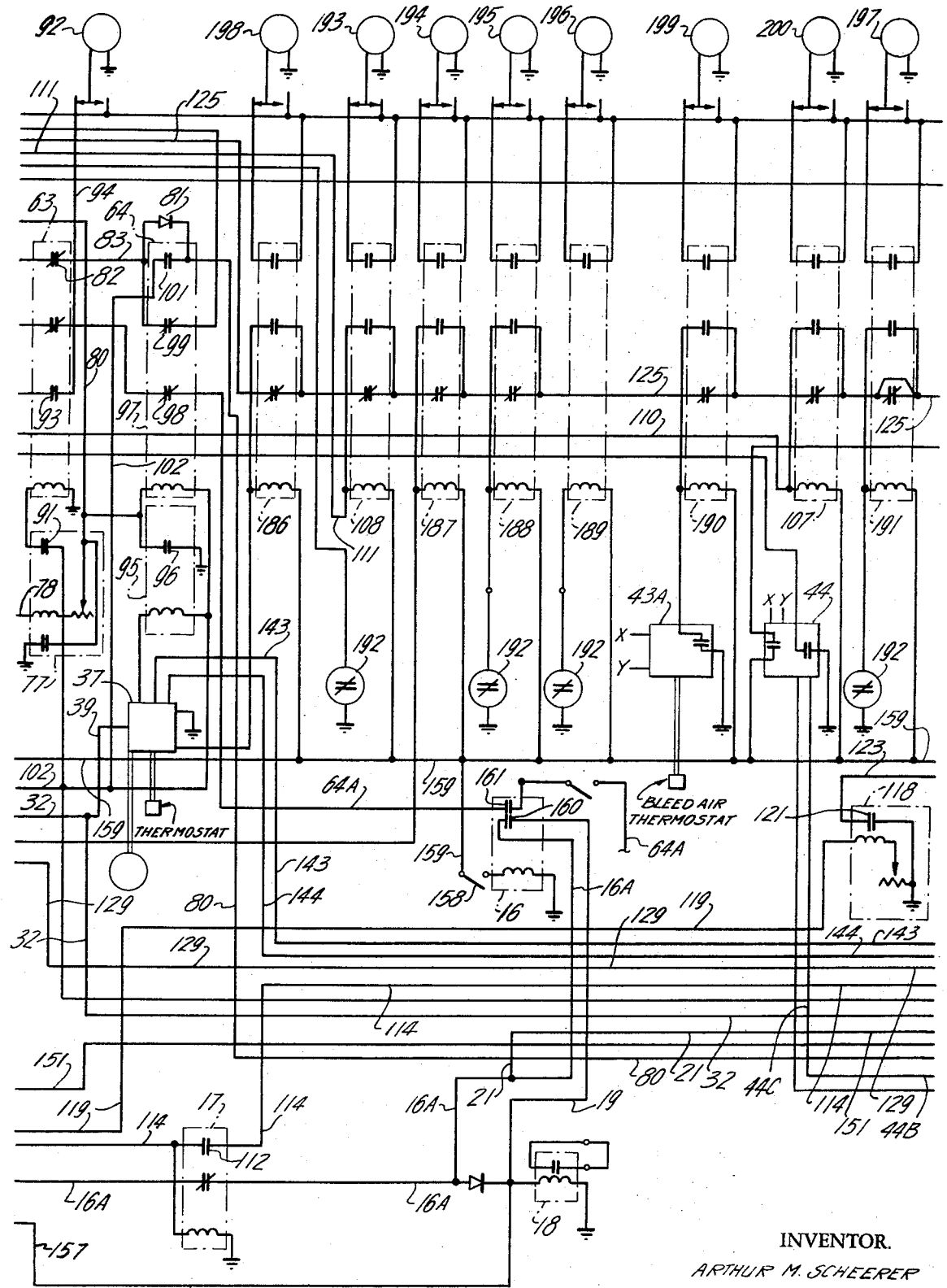

In start-up the system is initially set or energized by actuating the reset switch 15 to close the two pairs of contacts so that DC current from battery 12 is supplied to valve control relay 18 (FIG. 2), via line 16A (FIGS. 1 and 3), and the normally closed contacts of valve and throttle control relay 17 (FIG. 2). The energization of relay 18 effects a closing of contacts and the passage of an electrical signal to the solenoid of a main compressed air supply valve schematically represented at 18A via lines (not shown) connected to the source of AC current. If a characterizer (not shown) to which relay 18 is connected senses the valve 18A to be in the open position, it is closed to prevent excessive air bypass by maintaining engine compressor pressure ratio above a safe level. Actuation of reset switch 15 also energizes a relay 22 (FIG. 1) by connecting the coil of relay 22 to the source of AC current 11 (FIG. 3), through lines 23, 25 and 24. The actuation of the reset switch also completes a circuit to an inverter 26 (FIG. 3) through line 13 which energizes the coil of relay 14 and effects the closing of relay contacts. The inverter 26 functions to convert the battery DC current to AC current in the event of temporary loss of AC power as hereinafter more fully explained. With the system now armed, start-up phase of operation is commenced by actuation of an on-off switch 27 (FIG. 1) to the "on" or "run" position.

The actuation of on-off switch 27 to the "run" position, energizes alternating current motor relay 28 (FIG. 1) from battery 12, by way of reset switch 15 and line 16A, switch 27, and lines 30 and 31. The closing of the contacts of relay 28 connects the AC power source to the auxiliary service components, such as fuel pumps, lubricating pumps, hydraulic pumps (fuel control system), air cooler fans, and the like (not shown), through lines 25, 171 and 28A. At the same time current is conducted, via line 32 (FIGS. 1, 2 and 3) which connects with line 31, to a relay 33 (FIG. 3). The energization of relay 33 delivers AC current, both primary input current and that current provided by inverter 26, to amplifiers 43A, 44 and 45 through the closing of contacts 35 (FIG. 3). DC current is provided for a speed switch of "sequencer" 36 (FIG. 1) and an exhaust gas temperature switch 37 (FIG. 2) via lines 38 and 39, respectively, both of which connect with lead 32, as well as activating time-delay relay 40. The sequencer 36 comprises a plurality of switches and may be of any suitable type, such as the motor operated potentiometer manufactured by Crydom Division of International Rectifier Corporation of El Segundo, California. During the countdown of relay 40, if compressed air supply valve (not shown), is sensed by valve characterizer 18 in the open position, the supply valve is moved to a closed position. At the same time, motor speed throttle pot 20, if open, is closed by energization of relay (FIG. 3) via relay 16 and lines 16A and 21. A relay 42 (FIG. 1) is energized for a short period of time, such as 8 seconds, to open solenoid actuated engine pre-oil valves (not shown), while AC current from inverter 26 is delivered to a fuel controller 43 (FIG. 3). The fuel controller may be of any suitable fuel control mechanism of the pre-calibrated type well known to those skilled in the art. One such fuel controller is a type 1907 manufactured and sold by Woodward Governor Company of Rockford, Illinois modified to include a compressed air inlet temperature sensor (CIT), an electromagnetic governor (EGM), an electric governor remote series compensated (EGRSC), low signal selector and ambient temperature bias element. Also, AC inverter current is supplied to circuits and components thereof designated X-Y, such components being the air temperature amplifier 43A (FIG. 2) vibration amplifier 44 (FIG. 2), and primer amplifier 45 (FIG. 1). The vibration amplifier 44 includes several vibration sensing elements 44A (FIG. 3) connected to vibration amplifier 44 via lines 44B and 44C and strategically positioned at various locations in the engine.

When time-delay relay 40 (FIG. 1) actuates its contacts 40A, from its normally open position to a closed position, the coil of a time-delay relay 46 (FIG. 1) and a time-delay relay 47 (FIG. 1) are energized through a line 48 (see FIG. 1). The relay 46 closes normally open contacts 49 and 50. The closing of contact 49 in a line 51 supplies electric current to the coil of main relay 52 (FIG. 1) and delivers electric current to a timer unit 53, via a line 54, which connects with line 51. The time unit 53 may be of the type manufactured by A. W. Hayden Company of Waterbury, Conn. and designated Model L–6421. The activation of timer unit 53 initiates the start-up sequence of operation. The timer unit 53, through its normally closed contact $S_8$, completes an electrical circuit to a relay 55 via line 56 and speed switch $S_3$ of sequencer 36 which receives DC current through now closed contacts 126 of main relay 52. The energization of relay 55 causes a normally open contact 57 to close and, thus, energize through normally closed contacts 65 of relay 58 a first-starter solenoid 59, the energization of solenoid 59 effecting supply of DC current from battery 12 to a self-starter (not shown) of the engine. The self-starter, when made operative, functions to rotatively drive the engine compressor drive shaft (not shown).

When angular speed of the engine reaches a predetermined velocity, such as 1,000 RPM, the switch $S_2$ of sequencer 36 closes and thereby, through a suitable electrical lead 60 from main relay 52, activates the coil of relay 58. The energization of relay 58 applies voltage, from timer unit 53, to the fuel primers and igniters (not shown) of the engine (not shown) through lines 70 and 64A, normally closed contacts of relays 61 (FIG. 1), 63 (FIG. 2), and closed contacts 161 of the previously energized relay 16 and, also, through normally closed safety switches on the main compressed air supply valve (not shown), as more fully explained hereinafter.

The energization of the coil of relay 58 (FIG. 1) causes the normally closed points 65 to open to interrupt the electrical circuit to starter solenoid 59 and the normally open contact points 66 to close and apply boost or additional voltage to the engine self-starter (not shown) through a second self-starter solenoid 67. This increased speed of the engine self-starter increases the RPM of the engine. The energization of the coil of relay 58 also causes a third set of contacts 68 to close which thus permits electric current to flow to a time-delay relay 69 through a line 70 and to line 64A and the fuel primers and igniters as mentioned above.

The control system of this invention, at this stage of start-up operation, provides various failsafe system circuits in the event of malfunction to protect the engine against major damage to itself and the surrounding area.

One such circuit relates to failure of light-off of ignition of the priming fuel. This circuit includes the prime amplifier 45 (FIG. 1) which is connected by line 71 to a temperature sensing element (not shown), such as a thermocouple, attached to the combustor section (not shown) of the turbojet engine. If primer light-off is not sensed, as for example a temperature in the combustor of 700° F fails to occur, in the time period measured by time-delay relay 69, the contacts 72 of relay 69 will close. The closing of contacts 72 will cause the coil of relay 61 to be energized and the normally closed contacts 73 of relay 61, in line 64A, to open and thus interrupt electrical current flow, through line 64A, to the solenoid actuated fuel primers and igniters (not shown). This condition is visually presented by the lighting of "no prime" light 74 by the closing of contacts 75 of relay 61 when the coil of the latter is energized.

If the prime fuel ignition or combustion is sensed within the time measured by relay 69, in other words a predetermined combustion temperature (as for example 700° F) is reached in the combustor section of the engine in the present time, the coil of relay 62 (FIG. 1) is energized by the closing of contacts 45A of prime amplifier 45. This flow of current through the coil of relay 62 causes the normally closed contacts 76 of relay 62 to open and thereby de-energize relay 69 and simultaneously effect a closing of normally open contacts 76A to start a time-delay relay 77 (see FIG. 2), through a line 78. At the same time current is conveyed to a fuel valve relay 79 (FIG. 3), via a line 80, diode 81 (FIG. 2) and a normally closed contact 82 of relay 63 (FIG. 2) in line 83. The energization of relay 79 (FIG. 3) closes its contacts 84 so that inverted AC 110 volt current is supplied, via line 85, and normally closed contacts 86 of a relay 87, to a fuel solenoid operated valve (not shown) which may be of the Altair, three-way shut-off type manufactured by Altair, Inc., of Plymouth, Connecticut and designated Model 366V400. The opening of this fuel valve admits main fuel flow into the combustor of the engine (not shown) by way of fuel distributors (not shown) connected to fuel-air vaporizers (not shown). Also, a shutdown relay 88 is energized to close contacts 89 and supply DC current from battery 12 to the now open, normally closed, contacts 90 of relay 79.

Again, if at this point in operation main light-off or ignition of the fuel in combustor section (not shown) of the engine does not occur within the predetermined time period, as measured by time delay relay 77 (FIG. 2), fuel flow and ignition will be interrupted. This failsafe circuit is similar to that previously described with regard to the failure of priming fuel light-off. If main light-off or fuel combustion is not sensed by exhaust gas temperature switch 37 (FIG. 2) which may be adjusted to sense an exhaust gas temperature of about 400° F within the time set by relay 77, the normally open contacts 91 of relay 77 are closed to thus pass current to the coil of relay 63. The energization of relay 63 opens contacts 82 of the relay and thereby opens bypass line 83 (which connects with line 80, via diode 81) so that current flow to the Altair fuel valve (not shown), via relays 79 and 87 and line 80, is interrupted. This interruption of current flow to the Altair fuel valve (not shown) cuts off flow of fuel into the combustor of the engine. The voltage from relay 88 (FIG. 3) will pass the now closed contacts 90 of relay 79 and simultaneously effect energization of the coil of relay 87 and light a "no main" light 92 (FIG. 2), via normally open, but now closed, contacts 93 in line 94. This energization of relay 87 (FIG. 3) locks the normally closed contacts 86 in an open position until the actuation of reset switch 15 (FIG. 1).

An additional safety feature of the control system of this invention is that, in addition to the aforesaid failsafe main fuel supply circuit and the primary fuel supply circuit providing for the stoppage of fuel flow, the self-starter and fan motors are not stopped but continue to operate to purge the combustor section of the engine of the combustible fuel and fuel vapors which accumulate therein during the abortive ignition stage.

When main fuel combustion occurs within the prescribed time, as measured by time-delay relay 77, the exhaust gas temperature amplifier 37 actuates a relay 95 (FIG. 2) by passing voltage to its coil and thereby causing normally open contacts 96 to close and energize a relay 97 which results in opening normally closed contacts 98 and 99. The opening of contacts 98 interrupts the current flow to the priming fuel valves and igniters (not shown), via line 64A, so that priming fuel flow is stopped. Also, control of the Altair fuel valve relay 79 (FIG. 3) is transferred from timer unit 53 to the main relay 52. This is accomplished by the closing of the normally open contacts 101 of relay 97 (FIG. 2) so that current, flowing to line 80, bypasses line 83, and diode 81 is supplied from main relay 52 (FIG. 1) by way of line 102 and closed contacts 103 of main relay 52.

As the engine accelerates from idle, and attains a predetermined rotative speed, such as 3,000 RPM, a switch $S_3$ of sequencer 36 opens, cutting off engine self-starters (not shown) by de-energizing the coil of relay 55. The RPM of the engine is continuously sensed at the engine accessory gear box (not shown) by any suitable apparatus 104 (FIG. 1), such as a Model 3040A magnetic pulse unit manufactured by Electro-Products Laboratories, Inc. of Chicago, Illinois which converts changes in magnetic flux derived from the passage of gear teeth of the accessory gear box into electrical impulses. The sensing apparatus 104 is connected to sequencer 36 to effect actuation of various switches in response to predetermined or selected engine speeds.

As the engine continues to accelerate to a speed of 3,950 RPM, switch $S_4$ closes to thus effect energization of a relay 105 (FIG. 1), through line 106, which relay arms a vibration relay 107 (FIG. 2) and an oil pressure relay 108. Also, energization of relay 105 starts relay 17, through relay 47. The flow of current to the coil of relay 105 effects a closing of normally open contacts 109 in a line 110 which connects with the coil of vibration relay 107, while the closing of normally open contacts 111 of relay 105 allows current to flow to the coil of low oil pressure relay 108 by way of a line 111. When relay 17 (FIG. 2) is energized to close its normally open contacts, voltage is applied to a relay 113 (FIG. 3), through a line 114. The opening and closing of the normally closed contacts 115 and normally open contacts 116 of relay 113 directs 110 volt AC current to fuel motorized speed pot 20 which opens the engine throttle in fuel controller 43 and causes the engine to accelerate.

When the engine, with continued increase in speed above 3,950 RPM, attains a predetermined angular velocity, such as 4,500 RPM, switch $S_5$ of sequencer 36 (FIG. 1) closes to start a time-delay relay 118 (FIG. 2) through the electrical conduit 119 which includes closed switch $S_6$ and closed contacts 120 of relay 47 (FIG. 1). The time-delay relay 118 is set to close its normally open contact 121 after a lapse of a predetermined period of time, as for example 50 seconds, if the engine speed does not increase from 4,500 RPM to a preset speed, such as 7,300 RPM. In the event the engine, as sensed by magnetic pulse unit 104, does not attain within the aforesaid time period a speed of 7,300 RPM, switch $S_6$ of sequencer 36 remains closed and activates a "hangup" relay 122 (FIG. 3), via the now closed contacts 121 of relay 118 and a line 123. The energization of the coil of hangup relay 122 effects an opening of normally closed contacts 124. The opening of contacts 124 interrupts the electrical circuit in the ground line 125 which connects with the main relay 52 (FIG. 1) through a number of closed relay contacts. The de-energization of the coil of main relay 52 opens its contacts 103 and 126 and thereby effects a shutdown of the engine. This hangup is visually shown by a light 127 (FIG. 3).

If there is no malfunction and the engine attains the preset speed of 7,300 RPM before the time period, as for example 50 seconds, as measured by time delay relay 118 (FIG. 3), the contacts 121 will not close and hangup relay 122 will not be energized. When the engine speed attains 7,300 RPM a normally open switch $S_7$ of sequencer 36 closes and, through a normally open microswitch is closed at wide open throttle and lines 129, and 130, time-delay relay 131 (FIG. 3) is energized. This relay 131 is adjusted to close its normally open contacts 132 and 133 after a time period, as for example 15 seconds. Also, a by-pass relay 134 (FIG. 3) is energized by way of line 129.

After the predetermined time lapse measured by relay 131 passes, its contacts 131 and 132 close to cause a relay 135 to be energized, through a line 133A, and a low bleed pressure warning switch 136 to be armed, which switch functions to cause a warning light 137 to illuminate, via a line 138 and normally closed contacts 139 of relay 135, when the coil of relay 135 is de-energized by the opening of switch 136. This safety feature alerts an operator to the lack of sufficient compressed air where the turbojet engine (not shown) is being used to supply compressed air by bleeding or bypassing the air discharged from the compressor section of the engine. The energization of the coil of bypass relay 134 causes its normally open contacts 140 and 141 to close. The closure of contacts 140 effects, through line 142, a small (compared with the main air supply valve) compressed air bleed valve, schematically indicated at 142A, to close. This small compressed air bleed valve bleeds compressed air past the main air supply valve to prevent surging of the compressor of the engine during the acceleration phase of operation. The closing of contacts 141 of relay 134 closes a circuit, via lines 143 and 144, to exhaust gas temperature amplifier 37 and thereby transfers the exhaust gas temperature amplifier from the start circuit to the run circuit so that, if exhaust gas temperatures are sensed in excess of a predetermined value, as for example, 1,200° F, shutdown of the engine is initiated, which is to be distinguished from its operation during the start-up phase of engine operation when shutdown is initiated at a higher temperature, as for example 1,300° F.

In addition to the previously described failsafe features of the control system of this invention, provision is made for shutdown of the engine if the engine fails in startup to attain a speed of 3,000 RPM. If during startup phase of operation engine rotative speed does not attain the desired 3,000 RPM speed within 60 seconds as measured by the closing of a switch $S_1$ of timer unit 53 (FIG. 1), a timer switch $S_8$ opens and thereby deactivates relay 55 by interrupting the flow in line 56 of electric current to the coil of relay 55. The de-energization of relay 55 causes normally closed contacts 150 to again close and, through line 151, energize the coil of a relay 152 (FIG. 3). The activation of relay 152 opens normally closed contacts 153 and closes normally open contacts 154. The opening of contacts 153 breaks the circuit through ground line 125 which, as previously described, connects with main relay 52 (FIG. 1). The interruption of current flow through the main relay opens its contacts 103 and 126 and thereby shuts down the engine. This shutdown or incomplete start of the engine is visually shown by illumination of a light 155 (FIG. 3) upon the closing of contacts 154 of relay 152. The timer unit 53 at this time holds with the timer motor stopped, timer switches $S_1$, $S_8$ and $S_9$ in positions opposite to their normal positions shown in FIG. 1 until the on-off switch 27 (FIG. 1) is turned to the "off" position and thereby cause time delay relay 46 (FIG. 1) to start to time out as hereinafter more fully explained. When on-off switch 27 is turned to the "off" position, as in normal shutdown procedure, relays 40 and 47 de-energize and time-delay relay 46 starts so that after a predetermined interval of time, such as 3 minutes, its contacts 49 and 50 open. During this time interval, voltage from the "off" position of on-off switch 27 is applied, through the now closed contacts 49 of time-delay relay 46, to relay 18 (FIG. 2) via a line 157. The energization of relay 18 signals the compressed air supply valve 18A to close, thus closing a microswitch 158 (FIG. 2) which is associated with the coil of relay 16. Following the closing of microswitch 158, the current is conducted, via line 21, to relay 41 (FIG. 3) which energizes its coil and opens its contacts 162 and closes normally open contacts 163 so that throttle pot close-switch 164 is closed and throttle pot open-switch 165 is opened. This causes the throttle pot motor 20 to reduce fuel flow to the turbojet engine to thereby cause it to slow to idle. The engine then dwells at idle until relay 46 "times-out" and opens its contacts 49 and 50. The opening of contacts 49 opens the circuit of line 51 to main relay 52, and thereby de-energizes the system by contacts 103 and 126 of relay 52 returning to their normal open position. The current to the Altair valve is also discontinued by interrupting the flow of AC 110 volt current, through line 85, which occurs when the coil of relay 79 is de-energized and its contacts 84 return to the normal open position. The de-energization of relay 79 occurs when contacts 126 of main relay 52 open and thereby stops flow of current through line 102 and thus causes de-energization of the coil of relay 62 (FIG. 1) so that normally open contacts 76B of relay 62 return to the open position and breaks the circuit, in lines 83, 81 and 80, to relay 79.

At this stage in shutdown, time-delay relay 167 (FIG. 1) which is preset to open its contacts 166 and 168 after a specified time following de-energization, such as 3 minutes, starts and after its coil is de-energized by contacts 126 of main relay 53 opening, relay 167 maintains for that limited period its contacts 166 and 168 closed. By contacts 166 of relay 167 remaining closed, AC current continues to be supplied to the auxiliary components, via lines 28A and a line 171. This maintenance of operation of auxiliary components, such as the fans, insures that the engine is purged of all residual fuel vapors so that the possibility of any explosion of restarting is eliminated, and that the lubricating oil is supplied to the engine until its rotation has stopped.

In emergency stops instituted by actuation of switch 185 (FIG. 1), the compressed air valves (not shown) and the throttle speed pot will remain in position until the next start-up.

To avoid unintended shutdown of the engine due to momentary loss of AC current power, inverter 26 (FIG. 3) supplies the necessary AC current through lines 173 and 174 to amplifiers 43A, 44 and 45, and fuel controller 43 through the X-Y circuits. Simultaneously, the inverter supplies the necessary AC current to keep the Altair valve (not shown) open via a line 175. The inverter 26 only supplies this AC current for a relatively short period, as for example two seconds. If normal AC power input is not restored to the control system before the lapse of the aforesaid period, a time-delay relay 176 (FIG. 1), set for the same period of time as the inverter, opens the circuit to main relay 52 by opening contacts 177 and closing its contacts 178. The return of contacts 177 to the normally open position upon de-energization of relay 176 breaks the circuit, through line 125, to the coil of main relay 52 so that deactivation of the main relay 52 shuts down the system. The closing of contacts 178 connects a warning light 179, via a line 180 to a source of current so that an operator is advised as to the reason for engine shutdown.

In addition to the previously discussed failsafe or safety features forming part of the control system according to this invention, shutdown circuits, including air temperature amplifier 43A and vibration amplifier 44, are provided. Also, control system 10 includes shutdown circuits which comprise an excess engine temperature relay 185 (FIG. 2), engine overspeed relay 187 (FIG. 2), the low fuel pressure relay 188 (FIG. 2), low oil level relay 189 (FIG. 2), excessive aftercooler air temperature relay 190 (FIG. 2), and low hydraulic pressure relay 191 (FIG. 2).

Each of the relays 108, 187, 188, 189 and 191 are connected to sensing element actuated switches 192 which switches, when actuated, conduct current flow through the coils of their associated relays so that the relays are energized and their relay contacts reverse from their normal positions shown in FIG. 2. The closing of the contacts in relays 108, 187, 188, 189 and 191 in the electrical lines to indicia lights 193, 194, 195, 196 and 197, respectively, cause them to go on, thus indicating a problem situation. Simultaneously, other relay contacts open to break the circuit, through line 125, to the main relay 52 (FIG. 1) to thereby induce shutdown of the engine.

Similarly, excess temperature relay 186, excessive vibration relay 107, and excessive aftercooler temperature relay 190 are de-activated by cutting off current to their associated coils upon the sensing of a predetermined excess condition by the exhaust gas temperature amplifier 37, vibration amplifier 44, and air temperature amplifier 43A, associated with the aforesaid relays. When the aforesaid relays 186, 107, and 190 are energized so that their associated contacts reverse from their normal positions, shown in FIG. 2, the circuit to main relay 52, via line 125, is broken to effect shutdown of the system and the indicia lights 198, 199, and 200 connected to relays 186, 190 and 107, respectively, to be illuminated.

As shown in FIG. 1, the control system also has a relay 202 which is connected to a temperature and humidity sensor and amplifier 203, which relay 202 functions, through its contacts 204, to illuminate an indicator light 205 when an icing condition occurs in the engine air inlet and its coil is energized.

It is now believed readily apparent that the present invention provides a control system for the operation of a stationary turbojet engine which effects start-up, maintenance, and shutdown phases of operation of the engine automatically and by the actuation of a single on-off switch. It is a control system that monitors the operation of the engine and itself so that upon any malfunction or failure, automatic shutdown occurs. It also incorporates indicia lights which informs an operator of the reason or reasons for shutdown as well as the state and condition of operation.

What is claimed is:

1. A control system for controlling the operation of a turbojet engine having a plurality of electrically operative auxiliary components and employed in a stationary installation comprising:
   a. electrically operative fuel flow control means for regulating flow of fuel to the turbojet engine and, hence, its speed of operation;
   b. an on-off switch connected to a source of alternating current power;
   c. a main relay means connected to said source of alternating current power and said on-off switch so that in the "on" position of said switch the main relay means receives electrical current and transmits the same to said fuel flow control means; and
   d. a plurality of secondary relay means having their switches connected in series with said main relay means so that electrical current is passed from said source to the fuel flow control means by way of said main relay means and said secondary relay means;
   e. sensing element means for each of said plurality of secondary relay means to monitor an operative condition of the engine and in response to an undesirable predetermined condition to effect actuation of the associated secondary relay means and interruption of electrical power to said main relay means to thereby cease electrical current flow to the fuel flow control means and a shutdown of the engine;
   f. a source of direct current;
   g. a direct current inverter means for converting direct current to alternating current connected to the source of direct current and to the main relay means for delivery of converted alternating current to the fuel flow control means for a predetermined short period of time upon an interruption of alternating current from the source thereof; and
   h. a time-delay relay means connected to said direct current inverter means and said main relay means to pass alternating current from the inverter means for said predetermined short period, and after that period, cutting off such alternating current flow to the main relay means so that the engine shuts down.

2. The apparatus of claim 1 wherein said direct current source is from a direct current storage means.

3. The apparatus of claim 1 wherein a speed switch means is provided which includes a plurality of electrical switch members actuatable to open and closed positions in response to predetermined angular engine speeds and wherein each of said switch members are connected to the main relay and to said plurality of auxiliary components to control electrical power flow to those components as governed by engine speeds.

4. The apparatus of claim 1 wherein said main and secondary relay means are each electromechanical switches having contacts and a coil and which contacts are made and broken upon the energization and de-energization of the coil.

5. The apparatus of claim 1 wherein a time-delay relay means is connected with a fuel priming temperature sensing means and the main relay means, said time-delay relay means and fuel priming temperature sensing means coacting to interrupt electrical current flow to the main relay means and thereby initiate shutdown of the engine when the priming temperature sensing means does not sense a predetermined combustion gas temperature in the engine before a predetermined period of time measured by said time-delay relay means.

6. The apparatus of claim 5 wherein a second time-delay relay means is connected with a main fuel temperature sensing means and the relay means, said second time-delay relay means and the main fuel temperature sensing means cooperating to stop electrical current flow to the main relay means and, thereby initiate shutdown of the engine when the main fuel temperature sensing means does not sense a predetermined engine exhaust gas temperature before a predetermined period of time measured by said second time-delay relay means.

* * * * *

UNITED STATES PATENT OFFICE
CERTIFICATE OF CORRECTION

Patent No. 3,691,759          Dated September 19, 1972

Inventor(s) Arthur M. Scheerer

It is certified that error appears in the above-identified patent and that said Letters Patent are hereby corrected as shown below:

IN THE SPECIFICATION:

Col. 2, line 26, first word "sequence," should read --"sequencer,"--; line 29, the word "is" should be deleted; line 52, the word "present" should read --preset--.

Col. 4, line 16, the word "of" should read --"or"--; line 29, after the word "relay" first appearing, the number --41-- should be inserted.

Col. 5, line 6, the word "first-starter" should read --first self-starter--; line 64, the word "present" should read --preset--.

Col. 9, line 61, the word "the" should be deleted.

Col. 9, line 60, "explosion of" should read -- explosion on --.

Signed and sealed this 8th day of May 1973.

(SEAL)
Attest:

EDWARD M. FLETCHER, JR.
Attesting Officer

ROBERT GOTTSCHALK
Commissioner of Patents